United States Patent
Kanie et al.

(10) Patent No.: US 6,877,792 B2
(45) Date of Patent: Apr. 12, 2005

(54) SIDE-VISOR SUPPORT ASSEMBLY

(75) Inventors: Hideki Kanie, Toyohashi (JP); Shinichi Honzawa, Aichi (JP); Akihiko Sakiyama, Aichi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/436,241

(22) Filed: May 13, 2003

(65) Prior Publication Data

US 2003/0214149 A1 Nov. 20, 2003

(30) Foreign Application Priority Data

May 15, 2002 (JP) ........................................ 2002-140444

(51) Int. Cl.⁷ ................................................. B60J 5/00
(52) U.S. Cl. ...................................... 296/152; 296/154
(58) Field of Search ................................. 296/152, 154; 49/131; D12/191

(56) References Cited

U.S. PATENT DOCUMENTS

| | | | | |
|---|---|---|---|---|
| 5,251,953 A | * | 10/1993 | Willey | 296/152 |
| 6,557,927 B2 | * | 5/2003 | Kanie | 296/152 |
| 6,682,126 B2 | * | 1/2004 | Kanie | 296/152 |

FOREIGN PATENT DOCUMENTS

| | | | | |
|---|---|---|---|---|
| DE | 3133379 | * | 3/1983 | 296/152 |
| JP | 2001-124022 | | 5/2001 | |

* cited by examiner

*Primary Examiner*—Dennis H. Pedder
(74) *Attorney, Agent, or Firm*—Miles & Stockbridge P.C.

(57) ABSTRACT

An assembly for attaching a side-visor to a frame of a vehicle comprises a retainer that includes a mounting portion and a clip portion connected to the mounting portion by flexible straps that can be bent for alignment of the clip portion with a hole in the visor, through which a flanged pin is inserted into and coupled with the clip portion. Adjustability of the retainer, by virtue of the flexible straps, permits the same retainer to accommodate different visor inclinations and different visor hole positions.

20 Claims, 11 Drawing Sheets

SIDE-VISOR SUPPORT ASSEMBLY

CROSS REFERENCE TO RELATED APPLICATION

This application claims the benefit of Japanese Patent Application No. 2002-140444, filed May 15, 2002, incorporated herein by reference.

BACKGROUND OF THE INVENTION

The present invention relates to a retainer and to an assembly including the retainer for supporting a body on a frame, and is more particularly concerned with an assembly for supporting a side-visor on a frame such as a doorframe of a vehicle body.

An existing technique for attaching a side-visor will be described with reference to FIGS. 1 and 2. In FIG. 1, a side-visor 1 or 1A is bonded onto a doorframe 3 on the upper side of a window glass 2 or 2A with a double-sided adhesive tape or the like. In order to maintain the bonded condition of the side-visor or allow the side-visor to be held in its supported condition even if the adhesive tape peels off from the doorframe, the side-visor is fixed to the doorframe at two positions through a clip or the like. FIG. 2 shows a conventional side-visor support assembly 5 for maintaining the bonded condition of the side-visor 1 to the frame 3. FIG. 2 is a sectional view taken along the line A—A in FIG. 1, and the side-visor 1 is illustrated therein in the condition after it is supported on the frame 3.

In FIG. 2, the frame 3 includes a holding portion (channel) 7 for allowing a sealing rubber (seal) 6 for receiving the window glass to be fitted therein, and a bonding portion 9 for allowing the upper portion of the side-visor 1 to be adhesively bonded thereonto. Part of the holding portion 7 located on the lower side of the bonding portion 9 also serves as a mounting portion 11 for allowing a retainer 10 of the side-visor support assembly 5 to be attached thereto. The retainer 10 is made of a metal plate member. To attach the side-visor 1 to the frame 3, the upper portion of the side-visor 1 is first fixed to the bonding portion 9 of the doorframe 3 with a double-sided adhesive tape or the like. Then, a curved fitting portion 13 of the retainer 10 is pushed into a protuberance of the mounting portion of the frame 3 to attach the retainer 10 to the frame. The retainer 10 has an extended portion 14 extending toward the rear surface of the side-visor 1, and the extended portion 14 is formed with a mounting hole conformable to a fastening hole formed in the side-visor 1. The sealing rubber 6 is then pushed into the holding portion 7 of the frame 3, arid held therein. Under this condition, the extended portion 14 of the retainer 14 and a side-visor-function portion of the side-visor 1 are fastened together between an engagement pin 15 and a clip 17 as shown by phantom lines (two-dot chain lines) to support the side-visor 1 on the frame 3 through the retainer 10 attached the frame 3. Thus, even if the side-visor 1 bonded to the frame 3 with an adhesive tape or the like peels off from the adhesive tape due to deterioration in its adhesive force, the clip 17 and the engagement pin 15 keep fastening the side-visor 1 and the retainer 10 to allow the side-visor 1 to be supported on the frame 3 through the retainer 10.

The above conventional side-visor support assembly is composed of the retainer fixed to the mounting portion of the frame, the clip placed on the rear surface of the side-visor, and the engagement pin inserted into the side-visor from the front surface of the side-visor and engaged with the clip. This side-visor support assembly provides a simplified structure for facilitating the side-visor attaching operation. However, it is not adjustable, so that a large number of different retainers are required for attaching side visors to various types of vehicles.

Japanese Patent Laid-Open No. 2001-124022 discloses a clip comprising a female member and a male member, wherein a component such as an assist grip is attached to a first panel such as a roof lining with the female member, and then, the female member is pushed into a second panel such as an automobile body panel while aligning the first panel with the second panel to temporarily attach the component to the second panel with a leg portion of the female member, and then the male member is inserted into the female member to fixedly attach the component to the second panel without wobbling movement. This clip is not suited for attaching a side-visor to a doorframe of a vehicle, particularly where accommodation to attachment of side-visors to different types of vehicle is required.

BRIEF DESCRIPTION OF THE INVENTION

It is an object of the present invention to provide an improved retainer and an improved assembly including such a retainer, particularly a versatile side-visor support assembly capable of dealing with change in the attaching angle of a side-visor to a frame while maintaining structural simplicity and operational facility.

In one of its broader aspects, the invention involves a retainer having a support portion, a clip portion, and a connecting portion that connects the mounting portion and the clip portion and that is constructed to permit adjustment of the clip portion relative to the mounting portion. The connecting portion may comprise a flexible strap that can be bent to adjust the position and the orientation of the clip portion to accommodate the position and orientation of a hole in a side-visor, for example. More particularly, the strap may form a loop that can be expanded, contracted, and twisted. The loop may have branches that are connected to opposite sides of the clip portion or that converge to a side of the clip portion that faces the mounting portion.

The following non-limiting brief description of the invention specifically addresses the application of the invention to attachment of a side-visor to a doorframe of an automobile.

According to this application of the present invention, there is provided a side-visor support assembly for supporting a side-visor-function portion of a side-visor extending from a side-visor root portion attached to a frame of an automobile body comprising: a retainer fixed to a mounting portion of the frame, a clip connected to the side-visor-function portion; and an engagement pin adapted to be inserted from the front surface of the side-visor and engaged with the clip, so as to fasten the side-visor between the clip and the engagement pin to support the side-visor on the frame through the retainer. In the present invention, the retainer is preferably made as a one-piece component of plastic material and includes a frame-fitting mounting portion adapted to be fixed to the mounting portion of the frame, the clip, and an elongated connection portion for connecting the clip to the frame-fitting mounting portion. The connection portion is formed as an elongated connection strap having a flexibility capable of pivoting and moving the clip relative to the frame-fitting mounting portion so that the clip can be disposed at a predetermined position of the side-visor-function portion when the frame-fitting mounting portion is attached to the frame.

According to this side-visor support assembly, when the retainer is attached to the frame, the connection strap allows the clip to be pivoted and moved rotatably depending on the inclination of the side-visor to the frame, to accommodate both changes in the bend angle of the side-visor to the frame and changes in the distance between the frame-fitting mounting portion and a fastening hole of the side-visor. Thus, even if the bend angle and/or the position of the fastening hole in the side-visor are changed, the same engagement pin and retainer including the clip can be used, eliminating the need for providing different retainers and avoiding the risk of misattachment of an improper retainer.

In the above side-visor assembly, a single connection strap may be used. The connection portion may more preferably include a pair of connection straps connecting respective side edges of the frame-fitting mounting portion and the clip. In the latter case, even if one of the connection straps is broken, the connection of the frame-fitting mounting portion and the clip can be maintained by the other connection strap. Each of the connection straps may be formed in a semicircular shape curved at sides of the frame-fitting mounting portion and the clip. This configuration facilitates to-and-fro and crosswise movements of the clip relative to the frame-fitting mounting portion, and pivotal movement of the clip in twisting directions relative to the frame-fitting mounting portion. The connection strap may have a cross-section of a circular shape, a semicircular shape or a polygonal shape to obtain a desirable flexibility.

The connection portion may be formed as a pair of connection straps which extend from respective side edges of the frame-fitting mounting portion and converge to a position at an edge of the clip. With this configuration, the distance between the frame-fitting mounting portion and the convergence position may be arranged to fall within a dark region of the side-visor.

The convergence portion of the connection straps may have a structure allowing the frame-fitting mounting portion of the retainer to be pressed to the mounting portion of the frame to retain the frame-fitting mounting portion in the attached condition when the clip is attached to the side-visor. The pressing force can prevent the frame-fitting mounting portion from being unfolded, keeping the sealing rubber from being deformed. The connection strap may be configured to allow an operator to readily grip the frame-fitting mounting portion even if the retainer is attached to the side-visor in advance of mounting on the frame.

The engagement pin may include a shank adapted to be engaged with an engagement pawl provided in the clip, and a flange at one end of the shank extending radially from the shank to be brought into sealing contact with the front surface of the side-visor-function portion. This structure of the engagement pin provides enhanced sealing performance against rainwater falling on the side-visor. For providing more enhanced sealing performance of the flange, the flange may be made of soft plastic material in the area of the front surface of the flange and the peripheral portion of the flange, both of which are to be brought into surface contact and with the side-visor, and the remaining portion of the engagement pin including the shank may be made of hard plastic material.

Where a doorframe for receiving a window glass is formed with a seal-holding portion for allowing a sealing rubber for receiving the window glass to be fitted thereinto, the frame-fitting mounting portion of the retainer may include an insertion section extending to the seal-holding portion so as to be pressingly held in the seal-holding portion by the sealing rubber when the frame-fitting mounting portion is attached to the frame. The insertion section may be tapered widthwise to its end. The insertion section may be formed with a protrusion for preventing the insertion section from being pulled out of the sealing rubber. The end of the insertion section may be increased in thickness to provide enhanced rigidity therein, which more reliably prevents the insertion section from being pulled out of the sealing rubber.

BRIEF DESCRIPTION OF THE DRAWINGS

The invention will be more fully described in conjunction with the accompanying drawings, which illustrate preferred (best mode) embodiments, and wherein:

FIGS. 14A and 14B are sectional views showing how various side-visors are supported with the side-visor support assembly according to the first embodiment of the present invention, wherein FIG. 14A shows a supporting condition where the side-visor has a large downward inclination, and a fastening hole is located at a position far from a frame, and FIG. 14B shows another supporting condition where the side-visor has a small downward inclination, and a fastening hole is located at a position close to the frame.

FIGS. 22A and 22B are top plan views showing the relationship between retainers and a side-visor, wherein FIG. 22A shows the relationship between the retainer and the side-visor in the third embodiment, and FIG. 22B shows the relationship between the retainer and the side-visor in the first embodiment.

DETAILED DESCRIPTION OF THE INVENTION

The invention will be described in its application to attachment of a side-visor to a doorframe of an automobile body, but it will be appreciated that certain aspects of the invention have broader utility.

Figure 7:
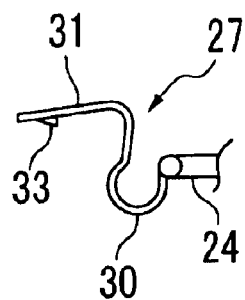
FIG. 7 is a partial front view showing one modification of an insertion section of a frame-fitting mounting portion of the retainer in FIG. 3.
Figure 8:
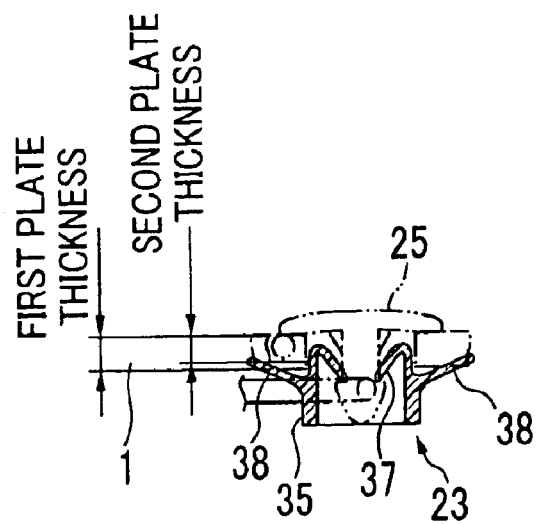
FIG. 8 is a sectional view of the clip in FIG. 3 showing its action.
Figure 9:
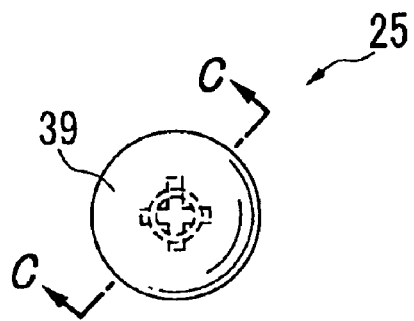
FIG. 9 is a top plan view of an engagement pin according to one embodiment of the present invention.
Figure 10:
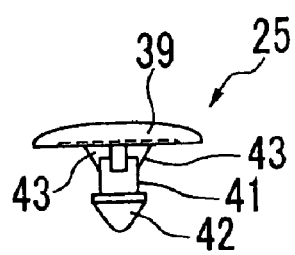
FIG. 10 is a front view of the engagement pin in FIG. 9.
Figure 11:
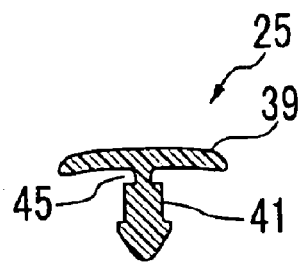
FIG. 11 is a sectional view of the engagement pin taken along the line C—C in FIG. 9.
Figure 12:
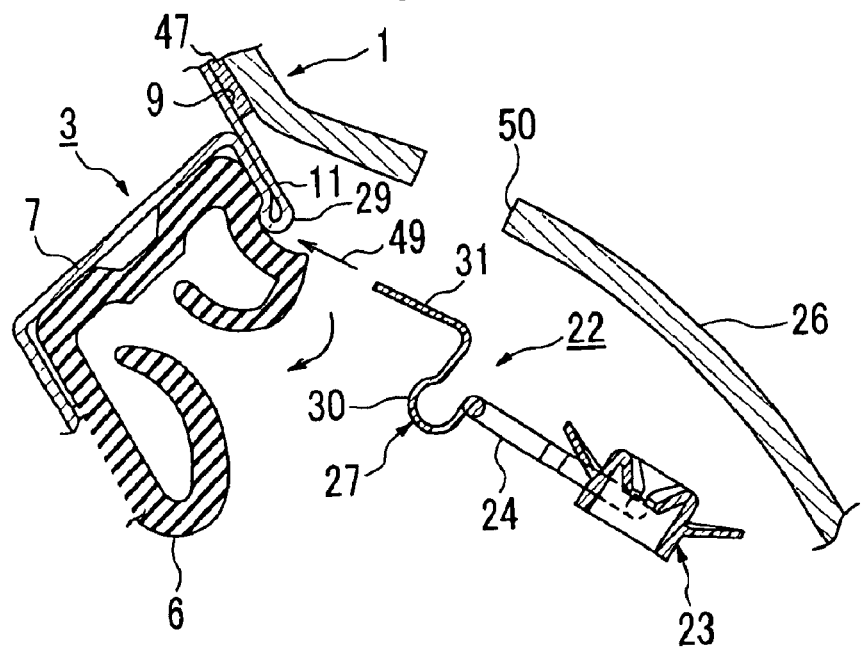
FIG. 12 is a sectional view taken along the line A—A in FIG. 1 showing the condition before a side-visor is attached using the side-visor support assembly according to the first embodiment of the present invention.

A side-visor support assembly 21 in a first embodiment of the present invention comprises a retainer 22 including a clip 23 as shown in FIGS. 3 to 8, and an engagement pin 25 as shown in FIGS. 9 to 11. As shown in FIGS. 12 and 14, in order to support a side-visor-function portion 26 extending from a portion of the side-visor 1 attached to the frame 3 of an automobile body, the retainer 22 is fixed to a mounting portion 11 of the frame, and connection straps 24 extend along the side-visor-function portion 26 to dispose the clip 23 connected thereto on the rear surface of the side-visor. Then, the engagement pin 25 is inserted into a fastening hole formed in the side-visor 1 from the front surface of the side-visor 1, and then, the pin is engaged with the clip 23. Thus, the side-visor-function portion 26 of the side-visor 1 is fastened between the clip 23 and the engagement pin 25 to be supported on the frame 3 through the retainer 22. The retainer 22 including the connection straps 24 and the clip 23 is preferably integrally formed in a one-piece molding of a plastic material. The engagement pin 25 may also be integrally formed of a plastic material.

With reference to FIGS. 3 to 8, the retainer 22, and the clip 23 and the connection straps 24 for connecting the clip 23 to the remaining portion of the retainer 22 will be described in detail. In the present invention, the retainer 22 includes the clip 23 integrally connected with the connection straps 24, which in the preferred form are branches of a loop. More specifically, the retainer 22 includes a frame-fitting mounting portion 27 to be fixed to the mounting portion 11 (see FIGS. 12 and 14) of the frame 3, the elongated connection straps 24 for connecting the clip 23 with the frame-fitting mounting portion 27 to extend the clip 23 to the side-visor-function portion 26, and the clip 23 connected with and supported by the connection straps 24. In the form shown, the frame-fitting mounting portion 27 is formed as a flat plate of a predetermined width and is curved in a certain contour so as to be fitted to the mounting portion 11 of the frame 3.

Figure 5:
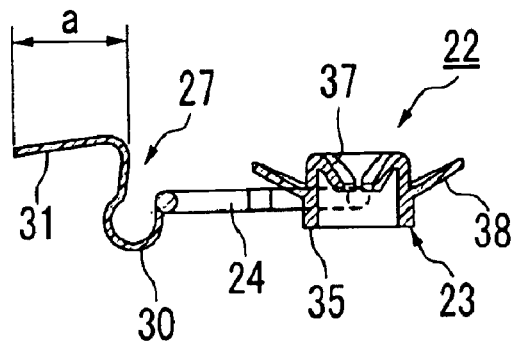
FIG. 5 is a sectional view of the retainer taken along the line B—B in FIG. 3.
Figure 6:
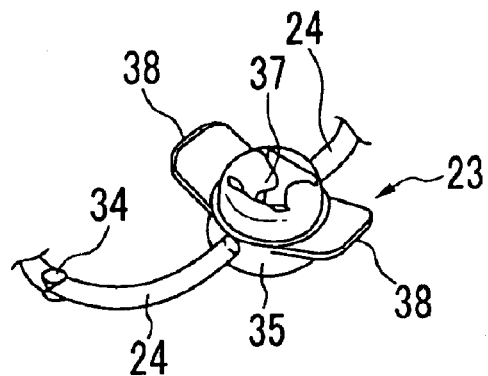
FIG. 6 is a partial perspective view of a clip and connection straps of the retainer in FIG. 3.

The frame-fitting mounting portion 27 includes a fitting section 30 adapted to be fitted to a thick bead region (protuberance) 29 (FIG. 12) at the edge of the mounting portion 11 of the frame 3 while sandwiching the bead region 29 therein, and an insertion section 31 extending from the fitting section 30 to a seal-holding portion (channel) 7, which is formed in the frame 3 to allow a sealing rubber (seal) 6 to be fitted thereinto, and adapted to be pressingly held by the sealing rubber 6. In the frame-fitting mounting portion 27, the fitting section 31 is fixed to the mounting portion 11 of the frame 3, and the insertion section 31 is inserted between the holding portion 7 of the frame 3 and the sealing rubber 6 disposed along the holding portion 7. Thus, a retainer made of plastic material can maintain a high attaching strength to the mounting portion. Although the length "a" of the insertion section 31 in FIG. 5 is shown as being shorter than the width of the holding portion 7, the length may be increased to provide an enhanced attaching strength of the retainer 22, so long as an operation of inserting the insertion section is not disturbed.

Figure 1:
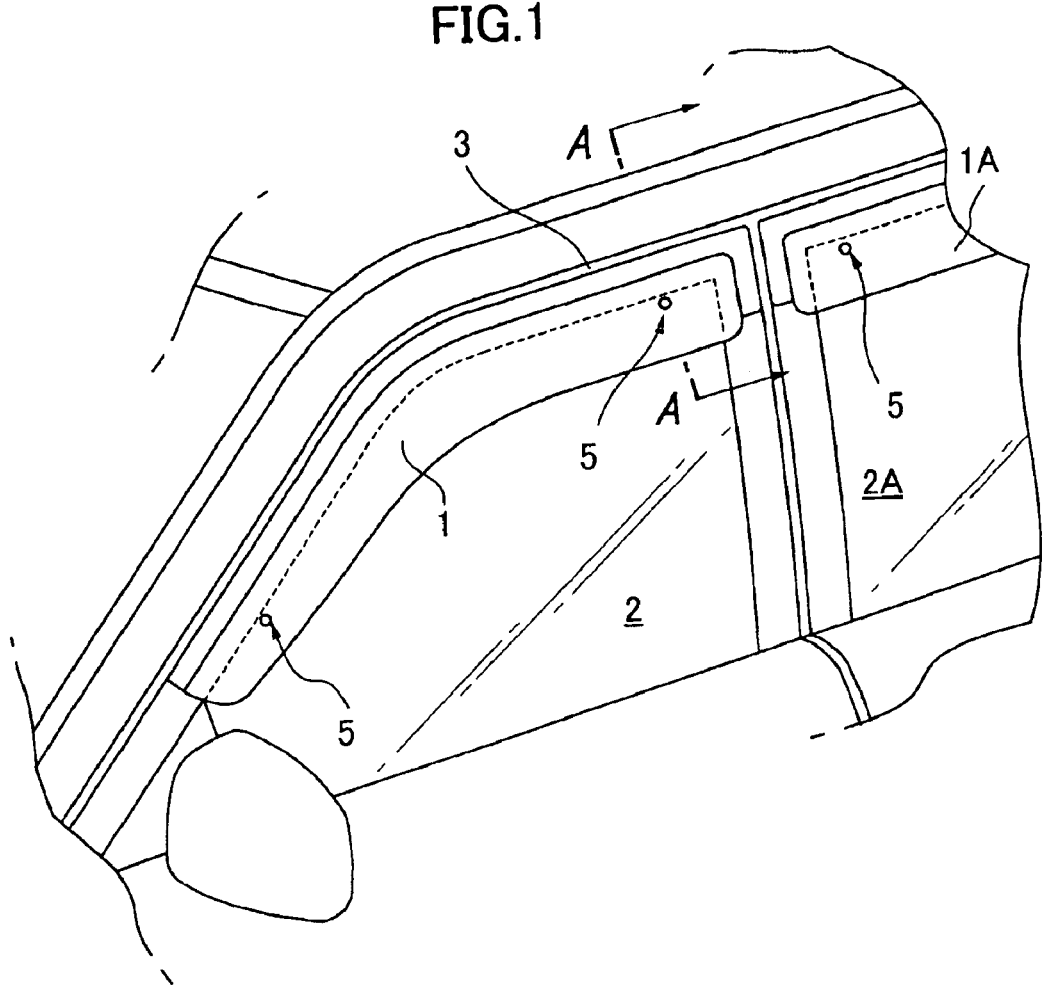
FIG. 1 is a perspective view showing an automobile having a side-visor attached to a frame.
Figure 2:
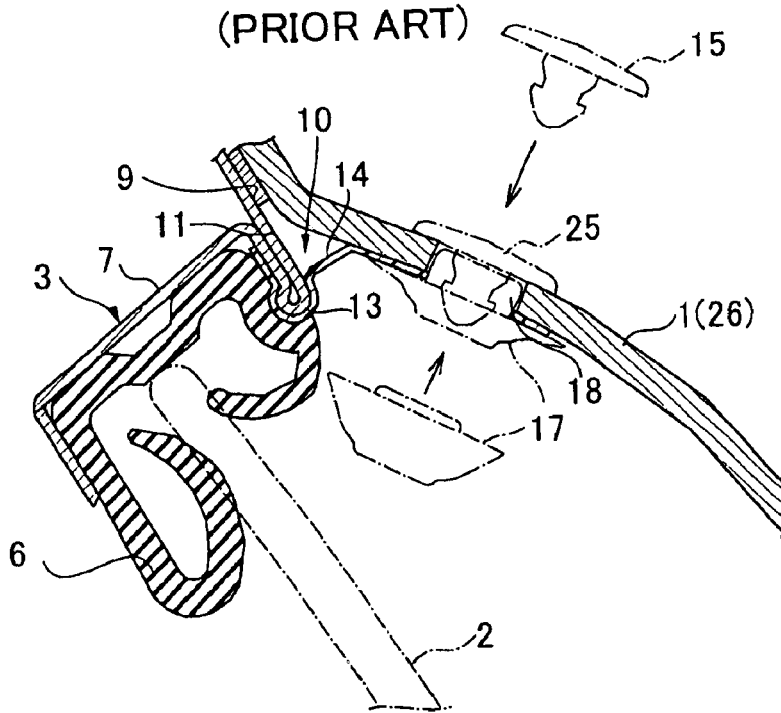
FIG. 2 is a sectional view taken along the line A—A in FIG. 1 showing the condition after a side-visor is attached using a conventional side-visor support assembly.
Figure 3:
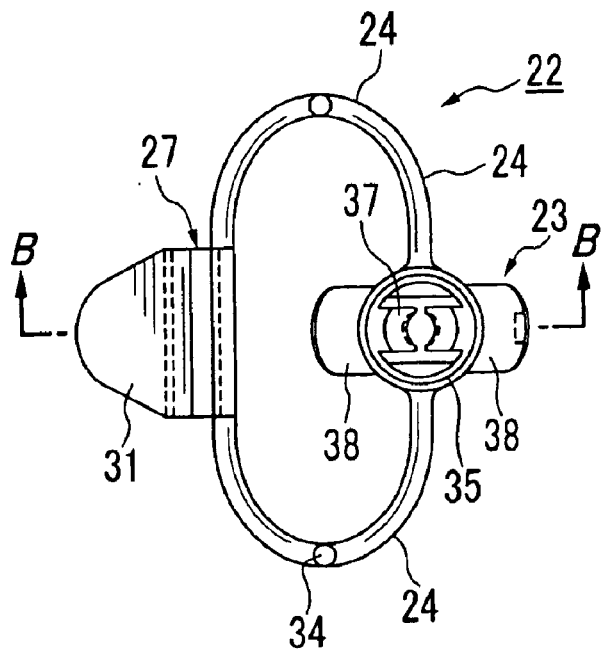
FIG. 3 is a top plan view of a retainer with clip of a side-visor support assembly according to a first embodiment of the present invention.
Figure 4:
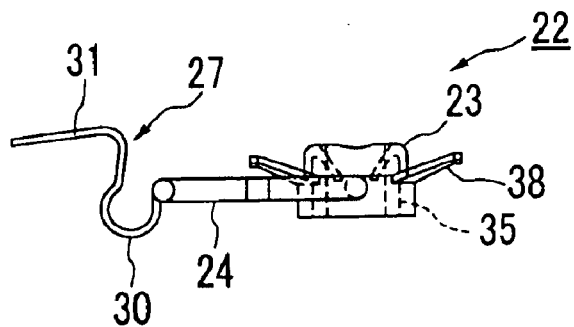
FIG. 4 is a front view of the retainer with clip in FIG. 3.

As shown in FIG. 3, the end of the insertion section 31 has a tapered width to facilitate the insertion operation. As shown in FIG. 7, the end of the insertion section 31 may also be formed with an anti-pull-out protrusion 33. The shape of the anti-pull-out protrusion 33 is designed to facilitate the operation of inserting the insertion section 31 to the sealing rubber 6, and prevent the insertion section 31 from being pulling out of the sealing rubber after the insertion operation. In addition to or in place of the protrusion 33, the end of the insertion section 31 may be increased in thickness to provide an enhanced rigidity therein. The enhanced rigidity more reliably prevents the insertion section 31 from being pulled out of the sealing rubber. The increased thickness should be decided in consideration of the relation with the sealing rubber. In a trial product, the increased thickness was provided in a portion of the insertion section 31 which is located at a space defined between the sealing rubber 6 and the holding portion 7 of the frame.

The connection straps 24 are preferably made of plastic material and formed as an elongated string-shaped member having a predetermined diameter. The connection straps 24 extend from the frame-fitting mounting portion 27 attached to the mounting portion 11 of the frame 3, and have one end connected with the clip 23. The connection straps 24 have a flexibility capable of allowing the clip 23 to be pivoted and moved relative to the frame-fitting mounting portion 27 so that the clip 23 is seated at a predetermined position (the position of the fastening hole) of the side-visor-function portion when the frame-fitting mounting portion 27 is attached to the mounting portion 11 of the frame 3. Although a single connection strap 24 may be used in this embodiment, the retainer preferably includes a pair of connection straps for connecting respective side edges of the frame-fitting mounting portion 27 of a certain width to respective side edges of the clip 23 of a certain width, as shown in FIG. 3.

The pair of connection straps allows the clip 23 to be reliably positioned along the side-visor-function portion 26, and facilitates the handling of the retainer 22 and the operation of attaching the clip 23 to the side-visor. Further, by virtue of the pair of connection straps, even if one of the connection straps is broken, the connection of the frame-fitting mounting portion 27 and the clip 23 can be maintained by the other connection strap. Each of the connection straps 24 may be formed in an approximately semicircular curved portion at a corresponding side of the frame-fitting mounting portion 27 and the clip 23. This configuration facilitates to-and-fro and crosswise movements of the clip 23 relative to the frame-fitting mounting portion 27, and pivotal movement of the clip 23 in twisting directions relative to the frame-fitting mounting portion 27. The connection straps 24 may have a cross-section of a circular shape, a semicircular shape or a polygonal shape to obtain a desirable flexibility. In a trial product, each connection strap was formed in a semicircular cross-sectional shape having a linear bottom side and a semi-oval upper portion, in conformity with the configuration of a molding die. Each connection strap 24 may also have a boss 34 at an intermediate position to allow an ejector pin for ejecting the connection strap from a molding die to be set thereto during a molding process.

The clip 23 is connected to the frame-fitting mounting-portion 27 through the connection straps 24. In the form shown, the clip 23 includes a tubular portion 35 with an opening for receiving therein a shank of the engagement pin 25, and a pair of engagement pawls 37 formed in the inside of the tubular portion 35. The side surface of the tubular portion 35 is formed with a pair of spring pieces 38, opposed to one another in the diametrical direction of the tubular portion 35. Each of the spring pieces 38 is designed to extend obliquely toward the side-visor 1 so as to be brought into spring contact with the side-visor in such manner that the spring pieces can be adequately bent depending on the thickness of the side-visor as shown in FIG. 8.

Figure 16:
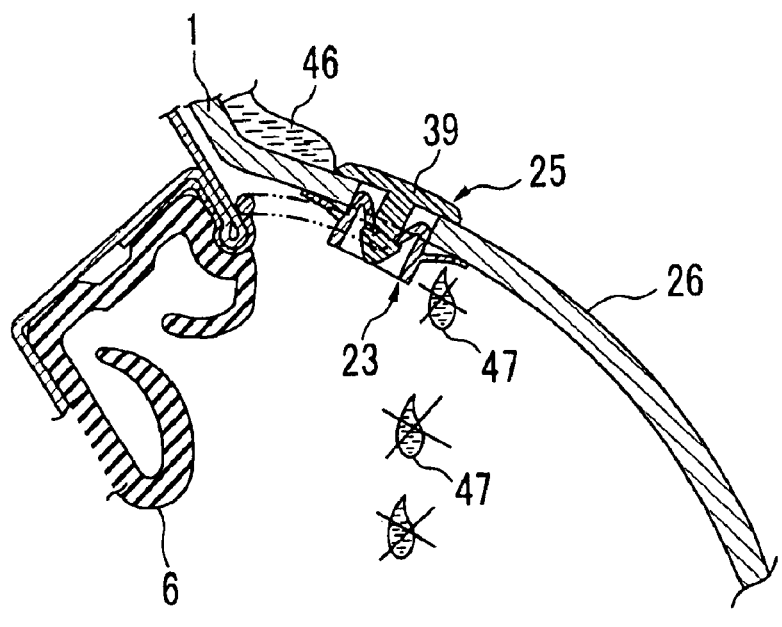
FIG. 16 is a sectional view showing an action of preventing leakage of water, such as rainwater, by means of a flange of the engagement pin.
Figure 16:
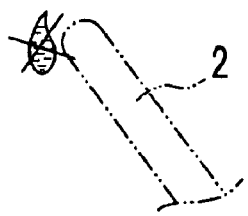

With reference to FIGS. 9 to 11, a preferred engagement pin 25 will be described in more detail. The engagement pin 25 is preferably integrally formed of a plastic material. The engagement pin 25 includes a large flange 39 to be seated on the front surface of the side-visor 1, and a shank 41 extending downward from the flange 39. The end (lower end) of the shank 41 is formed as a large engagement portion 42. When the shank 41 is inserted into the tubular portion 35 of the clip 23, the engagement portion 42 is engaged with the engagement pawls 37 to couple the engagement pin 25 to the clip 23. Preferably, the flange 39 is made of soft plastic material to allow the flange to be brought into sealing contact with the surface of the side-visor-function portion 26. The flange 39 of soft plastic material provides an enhanced sealing performance against rainwater falling on the side-visor. A plurality of ribs 43 may also be formed between the shank 41 and the flange 39 to assure the above sealing contact. Further, in order to prevent "sink mark" during a molding process from occurring on the front or ornamental surface of the flange 39, notches 45 as shown in FIG. 11 may be provided at the junction between the shank 41 and the flange 39 to reduce the area of the junction. As shown in FIG. 16, the flange 39 of the engagement pin 25 has an edge portion in sealing contact with the side-visor-function portion 26. Thus, if water 46, such as rainwater, falls on the side-visor 1, the flange 39 prevents the water from intruding toward the rear surface of the side-visor 26. Even if a window is opened, any water, e.g., rainwater droplets 46, does not drop toward an automobile cabin.

Figure 13:
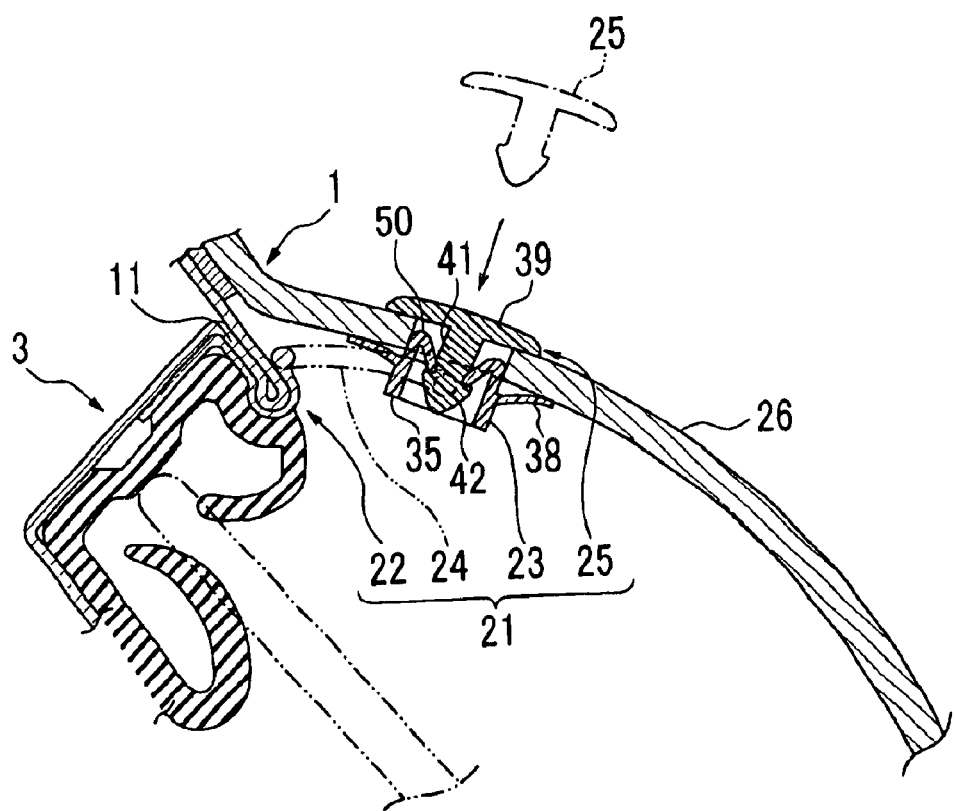
FIG. 13 is a sectional view taken along the line A—A in FIG. 1 showing the condition after the side-visor is attached using the side-visor support assembly according to the first embodiment of the present invention.

FIGS. 12 and 13 show an operation of supporting the side-visor 1 on a frame such as a doorframe by use of the side-visor support assembly 21 comprising the retainer 22 with the clip 23 and the engagement pin 25. In FIG. 12, for attaching the side-visor 1 to the frame 3, the upper portion of the side-visor 1 has been fixed to a bonding surface 9 of the doorframe 3 with a double-sided adhesive tape 47 or the like. The sealing rubber 6 has been pushed into and held by the holding portion 7 of the frame 3. An operator picks up the retainer 22, and inserts (arrow 49) the insertion section 31 of the retainer 22 between the sealing rubber 6 and the bead region (protuberance) 29 of the mounting portion 11 of the frame 3. By continuing this insertion, the insertion section 31 is inserted under the sealing rubber 6, and is pressedly held between the sealing rubber 6 and the holding portion of the frame 3. Simultaneously, the curved fitting section 30 of the frame-fitting mounting portion 27 is fitted to the bead region 29 of the mounting portion 11 of the frame 3. Thus, the retainer 22 is fixed to the frame 3. The insertion portion 31 pressedly held by the sealing rubber 6 can maintain a high attaching strength to provide an enhanced anti-pullout effect. If the anti-pull-out protrusion 33 is provided in the insertion section 31 as shown in FIG. 7, the anti-pull-out effect will be more enhanced.

The retainer 22 includes the clip 23 connected with the connection straps 24. Thus, the clip 23 is disposed close to or brought into surface contact with the side-visor-function portion 26 only by attaching the retainer 22 to the frame 3. The pair of flexible connection straps 24 between the frame-fitting mounting portion 27 and the clip 23 allow the clip 23 to be moved along the rear surface of the side-visor-function portion 26. Even if the inclination of the side-visor-function portion 26 varies and/or the position of the fastening hole 50 varies, the connection straps 24 allow the clip 23 to be easily pivoted and moved relative to the frame-fitting mounting portion 27, so that the upper surface of the clip 23 can be stably brought into contact with the rear surface of the side-visor 1. Through the above attaching operation, the engagement pawls 37 formed in the hollow portion of the clip 23 can be aligned with the fastening hole 50 of the side-visor 1.

Figure 14A:
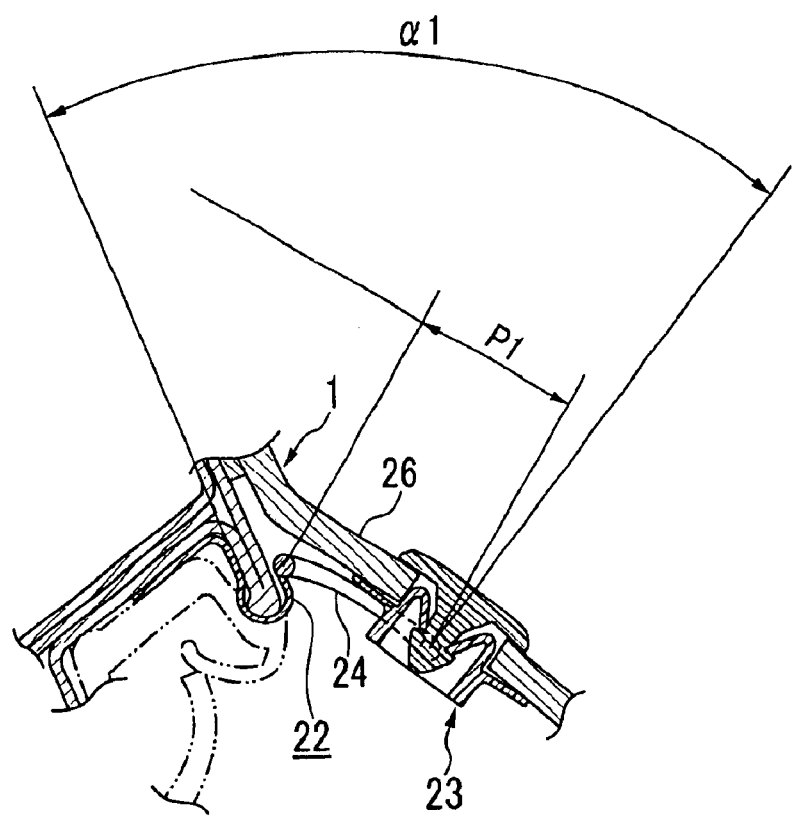
Figure 14B:
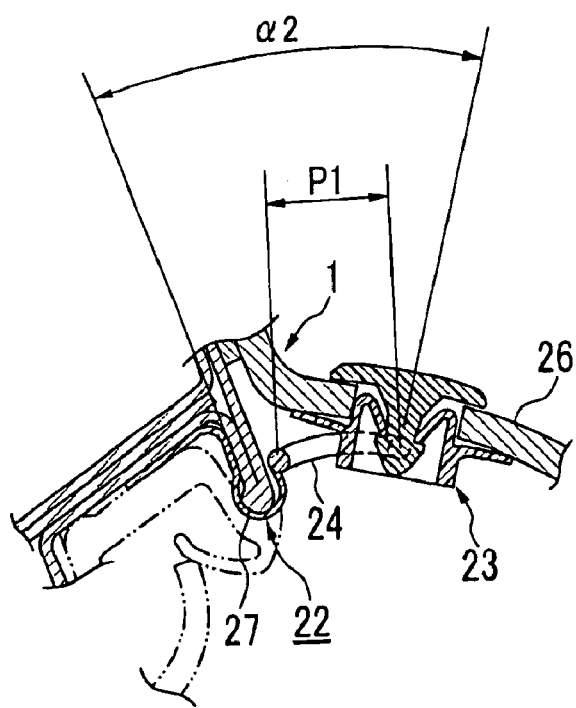
Figure 15A:
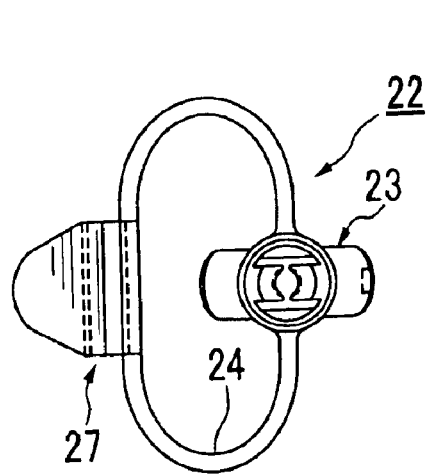
FIG. 15A is a top plan view showing the retainer of the side-visor support assembly according to the first embodiment, corresponding to FIG. 14A.
Figure 15B:
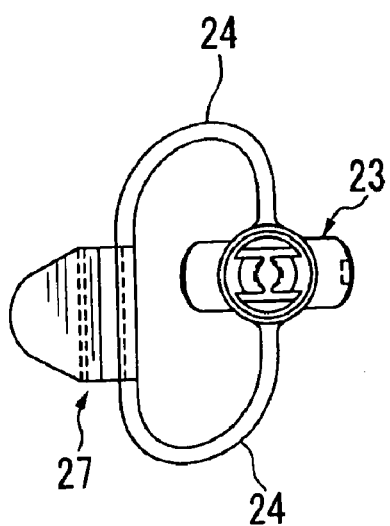
FIG. 15B is a top plan view showing adjustment of the retainer of the side-visor support assembly according to the first embodiment, corresponding to FIG. 14B.

With reference to FIGS. 14A and 14B and FIGS. 15A and 15B, an explanation will be given as to how the clip 23 can be brought into proper surface contact with the side-visor, and the engagement pawls 37 of the clip 23 can be properly positioned to the fastening hole 50 even if the bend angle of the side-visor-function portion 26 of the side-visor 1 or the position of the fastening hole 50 of the side-visor 1 is changed. When the fitting section 30 of the frame-fitting mounting portion 27 is attached to the mounting portion 11 of the frame 3, the clip 23 connected with the connection straps 24 is placed on or near the rear surface of the side-visor. Assume that the retainer 22 is formed such that the clip 23 is disposed at a proper position of the side-visor-function portion 26 without any deformation of the connection straps 24, in the condition as shown in FIG. 14A. In this condition, the shape of the retainer 22 is identical with that shown in FIG. 15A because the connection straps 24 are not deformed. When the retainer 22 is attached to a side-visor-function portion 26 different in the bend angle and/or the position of the fastening hole 50, the clip 23 can still be disposed on the rear surface of the side-visor at a position aligned with the fastening hole 50 of the clip 23, because the connection straps 24 can be deformed as shown in FIG. 15B. Specifically, even if the side-visor-function portion 26 has a relatively large bend angle α1 as shown in FIG. 14A or a relatively small bend angle α2 as shown in FIG. 14B, the clip can be properly brought into surface contact with the rear surface of the side-visor in the same manner. Further, even if the position of the fastening hole 50 in the side-visor-function portion 26 is changed to locate at a distance P1 as shown in FIG. 14A or a distance P2 as shown in FIG. 14B, the connection straps 24 allow the clip to be pivoted and moved relative to the frame-fitting mounting portion 27, so that the engagement pawls 37 of the clip 23 are located at a position aligned with the fastening hole 50.

After the clip 23 is properly disposed on the rear surface of the side-visor, the operator picks up the engagement pin 25, and inserts the shank 41 of the engagement pin 25 into the tubular portion 35 of the clip 23 through the fastening hole 50 of the side-visor 1. Through this operation, the engagement portion of the shank of the engagement pin is engaged with the engagement pawls 37 of the clip 23 to sandwich the side-visor 1 between the flange 39 of the engagement pin 25 and the clip 23. The spring pieces 38 press the rear surface of the side-visor (FIG. 13) to maintain an adequate engagement force of the engagement pin 25 with the clip 23. Since the clip is connected to the frame-fitting mounting portion 27 of the retainer 22 through the connection straps 24, and the frame-fitting mounting portion 27 is fixed to the mounting portion 11 of the frame 3, the side-visor 1 is fixed to the frame 3 through retainer 22 including the clip 23. After the above attaching operation, the edge of the flange 39 of the engagement pin 25 is in close contact with the side-visor function portion 26 as shown in FIG. 16 to prevent water 46 such as rainwater from intruding toward the rear surface of the side-visor-function portion 26 even if the water 46 falls on the side-visor.

Figure 17:
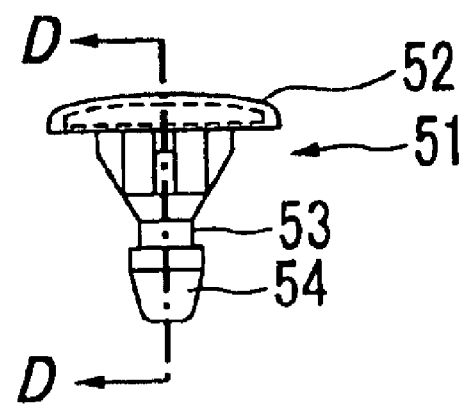
FIG. 17 is a front view of an engagement pin of a side-visor support assembly according to a second embodiment of the present invention.
Figure 18:
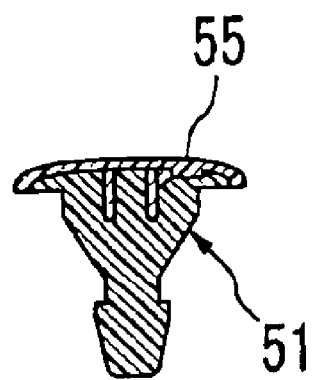
FIG. 18 is a sectional view of an engagement pin taken along the line D—D in FIG. 17.

FIGS. 17 and 18 show an engagement pin 51 of a side-visor support assembly according to a second embodiment of the present invention. As with the engagement pin 25 of the first embodiment, the engagement pin 51 is preferably integrally formed of plastic material, and comprised of a large flange 52 to be seated on the front surface of the side-visor 1, and a shank 53 extending downward from the flange 52. The end of the shank 53 is formed with a large engagement portion 54. When the shank 53 is inserted into the tubular portion 35 of the clip 23, the engagement portion 54 can be engaged with the engagement pawls 37. The front surface of the flange 52 and the peripheral edge of the flange 52 to be brought into surface contact with the side-visor may be formed as a soft portion made of a soft plastic material, and the remaining portion of the engagement pin including the shank 53 may be formed as a hard portion 55 made of a hard plastic material (by so-called two-color molding). This structure provides an enhanced sealing performance of the flange 52. In the same condition as shown in FIG. 16 for the engagement pin 25, the engagement pin 51 is in sealing contact with the side-visor function portion 26 through the edge of the flange 52 formed as the soft portion 55 to provide enhanced sealing against water 46 such as rainwater.

FIGS. 19 to 22 show a retainer 58 of a side-visor support assembly according to a third embodiment of the present invention. The retainer 58 comprises a frame-fitting mounting portion 59 adapted to be fitted to the mounting portion 11 of the frame 3, a clip 61, and flexible connection straps 62 for connecting the frame-fitting mounting portion 59 to the clip 61. The frame-fitting mounting portion 59 is formed as a flat plate of a certain width (in the vertical length in FIG. 19). The frame-fitting mounting portion 59 includes a fitting section 63 adapted to be fitted to the thick bead region 29 (FIG. 12) at the edge of the mounting portion 11 of the frame 3 while sandwiching the bead region 29 therein, and an insertion section 65 adapted to extend from the fitting section 63 to the seal-holding portion 7, allowing the insertion section 65 to be inserted into the seal-holding portion 7 and to be pressingly held by the sealing rubber 6. An end region 66 of the insertion section 65 may be increased in thickness to provide enhanced rigidity therein (see FIG. 21).

The connection straps 62 are formed as elongated string-shaped members. There are preferably a pair of connection straps 62 which extend from opposite side edges of the frame-fitting mounting portion 59 (upper and lower edges in FIG. 19) and converge to one position at the edge of the clip 61 facing the frame-fitting mounting portion. In the pair of connection straps 62, the distance 69 between the frame-fitting mounting portion 59 and the convergence portion 67 is arranged to fall within a dark region of the side-visor.

Figure 19:
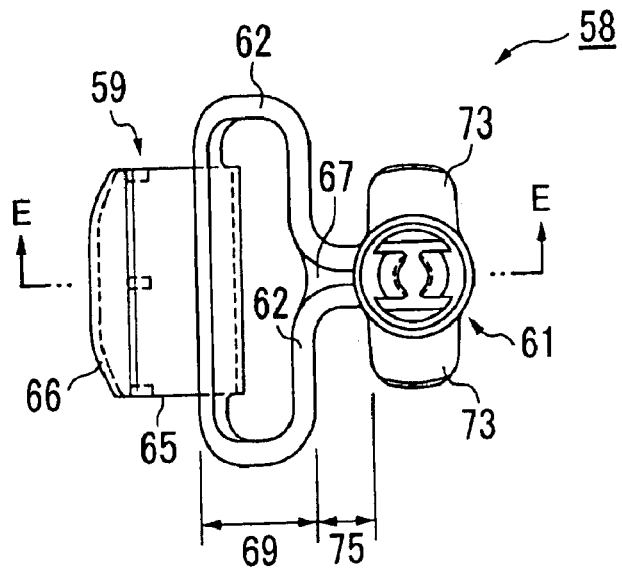
FIG. 19 is a top plan view of a retainer of a side-visor support assembly according to a third embodiment of the present invention.
Figure 22A:
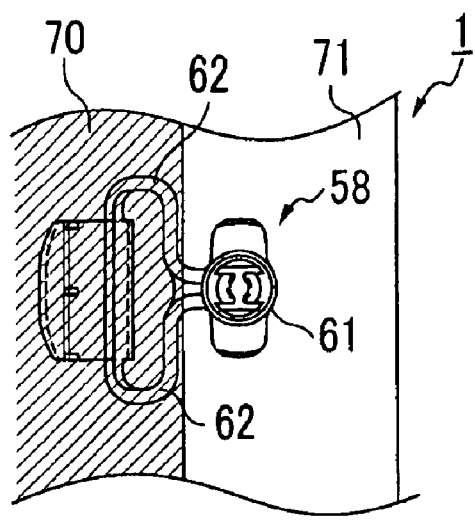
Figure 22B:
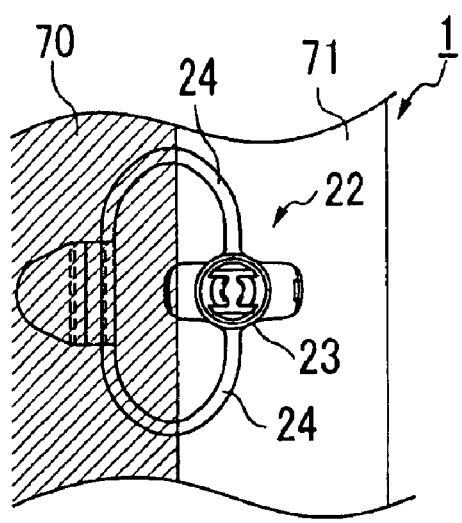

FIGS. 22A and 22B show the relationship between the connection straps 62 of the retainer 58 in the third embodiment and the connection straps 24 of the retainer 22 in the first embodiment. In FIG. 22B, the connection straps 24 of the retainer 22 of the first embodiment do not converge to a side edge of the clip 23. Thus, a large area of the connection straps 24 is exposed outside a dark region 70, allowing the connection straps 24 to be viewed from a transparent region 71 of the side-visor and resulting in deteriorated appearance. To improve appearance, the connection straps 62 of the retainer 58 are converged to one edge position of the clip to provide a reduced distance 69 (FIG. 19). Thus, most of the connection straps 62 are covered by the dark region 70 of the side-visor 1, as shown in FIG. 22A and are not apparent. The clip 61 includes a pair of spring pieces 73, 73 extending in an up-down direction in FIG. 19 so as not to interfere with the pair of connection straps 62 which are converged to an edge position of the clip 61.

Figure 20:
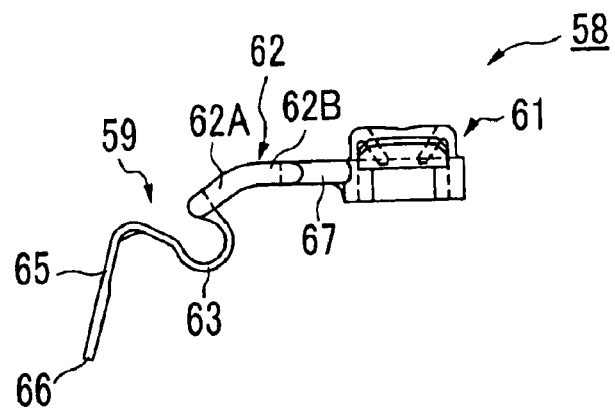
FIG. 20 is a front view of the retainer in FIG. 19.
Figure 21:
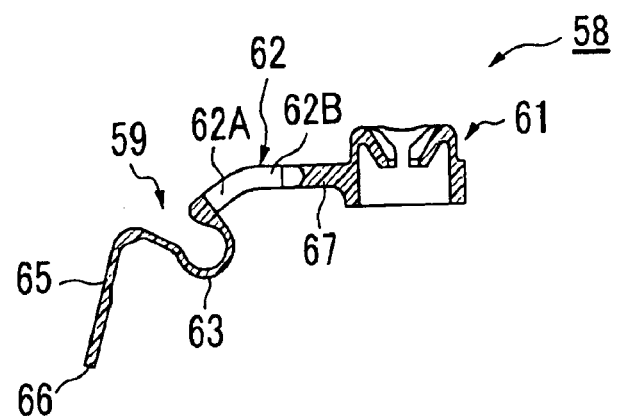
FIG. 21 is a sectional view of the retainer in FIG. 19 taken along the line E—E in FIG. 19.
Figure 23:
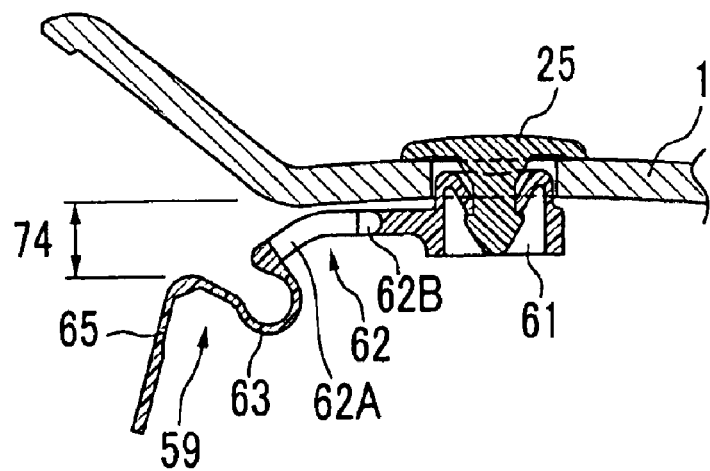
FIG. 23 is a sectional view showing a retainer which is previously attached to the side-visor in a third embodiment.

The retainer may be attached to the side-visor in advance of attaching the side-visor to the frame. In this case, it is desired to allow an operator to easily handle the retainer attached to the side-visor. To this end, a portion 62A of the retainer 58 on the side of the frame-fitting mounting portion 59 is bent toward the rear surface of the clip 61 with respect to the remaining portion 62B of the clip 61, as shown in FIGS. 20 and 21. When the clip 61 is attached to the side-visor 1 with the engagement pin 25 (or 51) as shown in FIG. 23, the portion 62A bent from the portion 62B is spaced apart from the side-visor to assure a clearance 74 between the frame-fitting mounting portion 59 and the side-visor 1. The clearance 74 allows the operator to readily grip the insertion section 65 and the fitting section 63 of the frame-fitting mounting portion 59.

As stated earlier, in the retainer 58 the connection straps 62 are converged and connected to one edge of the clip 61. FIG. 19 shows a convergence portion 67 of the connection straps 62. In FIG. 19, the convergence portion 67 extends a predetermined distance 75 to an edge of the clip 61. This convergence portion 67, which is composed of converged and joined connection straps 62, has a certain rigidity. In this condition, after the clip 61 is attached to the side-visor 1 and the frame-fitting mounting portion 59 is attached to the mounting portion 11 of the frame, the convergence portion 67 acts to prevent the fitting section 63 from being unfolded. This action will be described with reference to FIG. 24.

Figure 24:
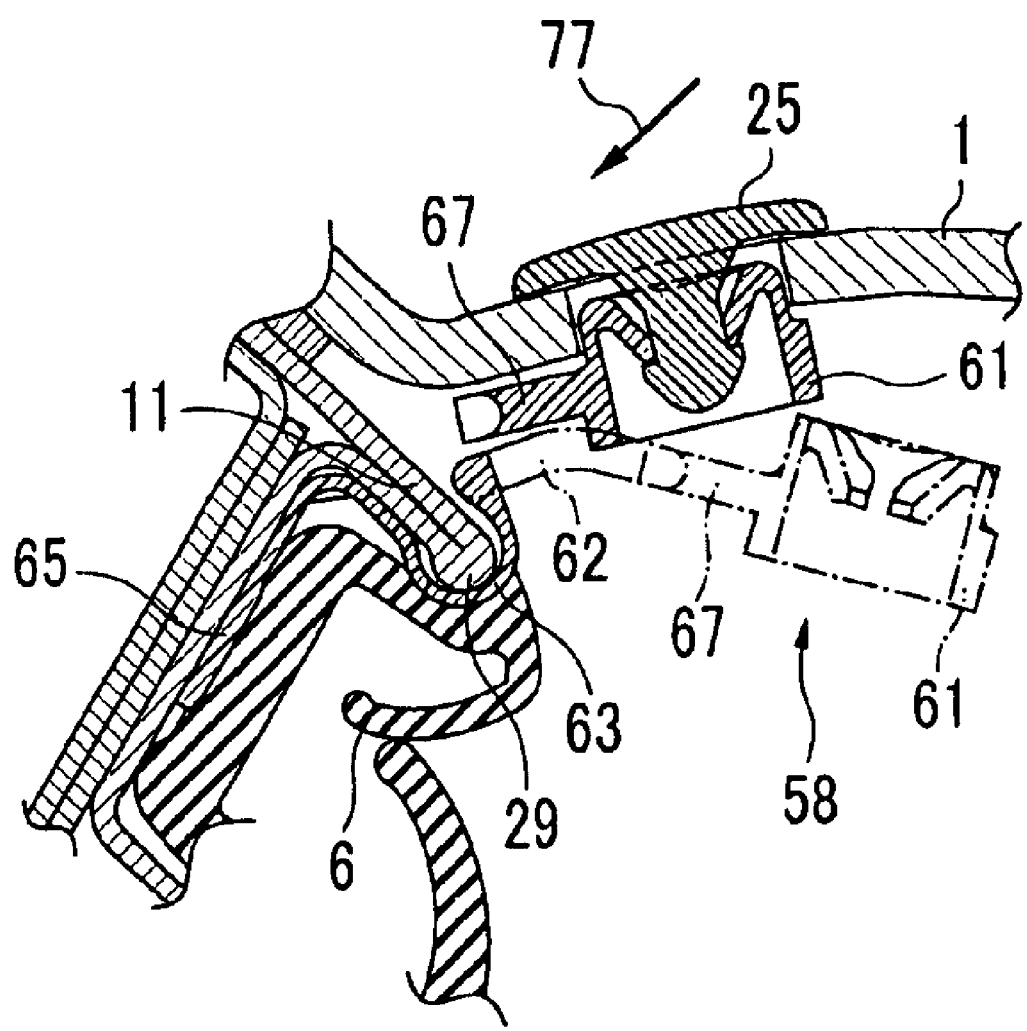
FIG. 24 is a sectional view showing that a fitting portion is not unfolded when the retainer according to the third embodiment is attached to the frame and the side-visor.

In FIG. 24, after the fitting section 63 of the retainer 58 is fitted and attached to the bead region 29 of the mounting portion 11 of the frame, when the clip 61 is moved from a position shown by the phantom line to a position shown by the solid line, and attached to the side-visor 1 with the pin 25, the convergence portion 67 pushes the end of the fitting section 63 of the frame-fitting mounting portion 59 by virtue of the rigidity of the convergence portion 67. The arrow 77 shows the direction of a force of the convergence portion 67 pressing the fitting section 63 when the clip 61 is attached to the side-visor 1. The pressing force acts to allow the fitting section 63 to be kept in the position where it is fitted to the bead region 29 of the frame so as to prevent the fitting section 63 from being unfolded. If the fitting section 63 were unfolded, the sealing rubber 6 would be deformed in the unfolded direction of the fitting section 63. The resulting displacement of the sealing rubber 6 from its normal position would undesirably cause a risk in that the window glass could bite into the sealing rubber when the window glass is closed.

According to the present invention, when the retainer is attached to the frame, the connection strap allows the clip to be pivoted and moved rotatably to accommodate changes in the bend angle of the side-visor to the frame and in the distance between the frame-fitting mounting portion and a fastening hole of the side-visor. Thus, even if the bend angle and/or the position of the fastening hole in the side-visor are changed, the same assembly of engagement pin and retainer including the clip can be used, eliminating the need for providing different assemblies and avoiding the risk of misattachment of a retainer during an operation of attaching the retainer to the frame. By integrally forming the clip as part of the retainer, advantages of structural simplicity and ease of manufacture and use can be attained.

While preferred embodiments of the invention have been shown and described, those skilled in the art will recognize that various changes can be made without departing from the principles and spirit of the invention, the scope of which is defined in the appended claims.

What is claimed is:

1. An assembly for attaching a visor having a hole therethrough to a frame, comprising:
   a one-piece retainer having a mounting portion for retention by the frame, a clip portion for alignment with the hole at one side of the visor, and a connecting portion that connects the mounting portion to the clip portion and that is constructed to bend so that the disposition of the clip portion relative to the visor can be adjusted for alignment of the clip portion and the hole, wherein the clip projects from the connecting portion; and
   a pin for insertion into the clip portion through the hole from a side of the visor opposite to the one side and having a flange that engages the opposite side of the visor when the pin is inserted into the clip portion, the clip portion and the pin having cooperable coupling elements that couple the pin to the clip portion,
   wherein the connecting portion comprises an elongated strap forming a loop extending between the mounting portion and, the clip portion.

2. An assembly according to claim 1, wherein the loop has a pair of branches extending, respectively, between corresponding sides of the mounting portion and the clip portion.

3. An assembly according to claim 1, wherein the loop has a pair of branches extending, respectively, from opposite sides of the mounting portion and converging to a side of the clip portion that faces the mounting portion.

4. An assembly for attaching a visor having a hole therethrough to a frame, comprising:
   a one-piece retainer having a mounting portion for retention by the frame, a clip portion for alignment with the hole at one side of the visor, and a connecting portion that connects the mounting portion to the clip portion and that is constructed to bend so that the disposition of the clip portion relative to the visor can be adjusted for alignment of the clip portion and the hole, wherein the clip projects from the connecting portion; and
   a pin for insertion into the clip portion through the hole from a side of the visor opposite to the one side and having a flange that engages the opposite side of the visor when the pin is inserted into the clip portion, the clip portion and the pin having cooperable coupling elements that couple the pin to the clip portion,
   wherein the clip portion has a tubular part to receive the pin therein.

5. An assembly according to claim 4, wherein the coupling elements of the clip portion are in the tubular part.

6. An assembly for attaching a visor having a hole therethrough to a frame, comprising:
   a one-piece retainer having a mounting portion for retention by the frame, a clip portion for alignment with the hole at one side of the visor, and a connecting portion that connects the mounting portion to the clip portion and that is constructed to bend so that the disposition of the clip portion relative to the visor can be adjusted for alignment of the clip portion and the hole, wherein the clip projects from the connecting portion; and
   a pin for insertion into the clip portion through the hole from a side of the visor opposite to the one side and having a flange that engages the opposite side of the visor when the pin is inserted into the clip portion, the clip portion and the pin having cooperable coupling elements that couple the pin to the clip portion,
   wherein the clip portion has a spring member extending therefrom to engage the visor attached to the retainer by coupling of the clip portion and the pin.

7. An assembly according to claim 1, wherein the retainer is a plastic molding.

8. An assembly supporting a side-visor on a frame of a vehicle body comprising:
   a retainer fixed to a mounting portion of the frame and having a clip; and an engagement pin inserted from a front surface of the side-visor and engaged with the clip, so as to fasten the side-visor between the clip and the engagement pin to support the side-visor on the frame through the retainer,
   wherein the retainer is made of a single piece of plastic material and includes a frame-fitting portion fixed to the mounting portion of the frame and an elongated connection portion connecting the clip to the frame-fitting portion, and
   the connection portion is formed as an elongated strap having a flexibility capable of pivoting and moving the clip relative to the frame-fitting portion so that the clip is disposed at a predetermined position of the side-visor when the frame-fitting portion is attached to the frame.

9. The assembly as defined in claim 8, wherein each of the frame-fitting portion and the clip has a predetermined width, and the connection portion comprises a pair of connection straps connecting respective side edges of the frame-fitting portion to respective side edges of the clip.

10. The assembly as defined in claim 9, wherein each of the pair of connection straps has a curved portion at respective sides of the frame-fitting portion and the clip.

11. The assembly as defined in claim 8, wherein each of the frame-fitting portion and the clip has a predetermined width, and the connection portion comprises a pair of connection straps which extend from respective side edges of the frame-fitting portion and converge to one position at an edge of the clip, wherein the distance between the frame-fitting portion and the convergence position is arranged to fall within a dark region of the side-visor.

12. The assembly as defined in claim 11, wherein a convergence portion of the connection straps is constructed to allow the frame-fitting portion of the retainer to be pressed to the mounting portion of the frame to retain the frame-fitting portion attached to the frame when the clip is attached to the side-visor.

13. The assembly as defined in claim 8, wherein the connection strap has a curved portion between the frame-fitting portion and the clip.

14. The assembly as defined in claim 8 wherein the connection strap has a cross-section that is one of a circular shape, a semicircular shape or and a polygonal shape.

15. The assembly as defined in claim 8, wherein the engagement pin includes a shank engaged with an engagement pawl provided in the clip, and a flange at one end of the shank and extending radially from the shank to be brought into sealing contact with the front surface of the side-visor.

16. The assembly as defined in claim 15, wherein the flange of the engagement pin is made of soft plastic material in the area of a front surface thereof and a peripheral portion thereof, both of which are to be brought into surface contact with the side-visor, and a remaining portion of the engagement pin including the shank is made of hard plastic material.

17. The assembly as defined in claim 8, wherein the frame is a doorframe receiving a window glass, the doorframe being formed with a seal-holding portion holding therein a seal for the window glass, and the retainer includes an insertion section extending from the frame-fitting portion to the seal-holding portion and held between the seal-holding portion and the seal.

18. The assembly as defined in claim 17, wherein the insertion section is tapered widthwise to its end.

19. The assembly as defined in claim 17, wherein the insertion section is formed with a protrusion for preventing the insertion section from being pulled out of the seal.

20. The assembly as defined in claim 17, wherein an end of the insertion section is increased in thickness to provide enhanced rigidity therein.

* * * * *